Patented Apr. 22, 1952

2,593,619

UNITED STATES PATENT OFFICE 2,593,619

TREATMENT OF HYDROCARBON OILS WITH AN ALKYL OXALATE AND AN ALKALI ALCOHOLATE

John O. Smith, Jr., North Plainfield, and Allen R. Jones, Roselle, N. J., assignors to Standard Oil Development Company, a corporation of Delaware No Drawing. Application July 19, 1950, Serial No. 174,778

12 Claims. (Cl. 196—23)

This invention relates to the treatment of hydrocarbon oils and refers more particularly to the treatment of the lighter distillates produced in the cracking of heavier oils.

It is known in the art to treat oils, particularly petroleum oils, in order to improve the quality thereof. It is also known in the art that cracked fuels contain constituents which form gum or resins which deposit on the working parts of the engine.

It has now been found that the quality of cracked petroleum fuels may be improved by treating them with a solution of an alkyl oxalate in alcohol in the presence of a small amount of an alkyl alcoholate.

The process of the present invention may be widely varied. Although the process may be employed for the treatment of any petroleum oil containing objectionable constituents, it is particularly applicable to the treatment of motor gasolines.

The reagents of the present invention are selected from the class of alkyl oxalates having the following typical formula:

in which R represents an alky group containing from 1 to 4 carbon atoms, such as methyl, ethyl, i-propyl, butyl, isobutyl, etc. These oxalates are conveniently employed in solution, for example dissolved in alcohol. A small amount of a catalyst is employed, preferred catalysts being alkali metal alcoholates characterized by having a linkage RO—X where R is an alkyl group and X is chosen from the class consisting of sodium and potassium. Substances of this class are sodium methyl alcoholate, sodium ethyl alcoholate, sodium butyl alcoholate, potassium propyl alcoholate, potassium amyl alcoholate, and the various alkali metal alcoholates of the polyhydroxy alcohols, such as sodium glycolate. The preferred compounds are the sodium alcoholates of the monohydroxy alcohols, the constituents of which contain from 1 to 4 carbon atoms to the molecule.

The method of contacting the oxalate reagent and the petroleum oil will vary considerably and will in general depend upon the particular oil being treated and the particular oxalate used. Usually it is preferred to treat the oil with an alcoholic solution of the oxalate and alcoholate. It is often convenient to use the alcohol from which the alcoholate was derived.

The operating conditions likewise may be widely modified. Temperature and pressure may vary and will depend upon the particular feed oil being treated, and the particular oxalate-alcohol solution used.

In general when extracting oil with the oxalate solution it is preferred to employ atmospheric temperatures and pressures although temperatures in the general range of 30–150° F. may be employed in specific instances. Usually 0.1 to 2% of reagent per volume of oil is preferred, but higher concentrations may be used.

The fuel should be dry to prevent hydrolysis of the alcoholate catalyst. Drying of the fuel by conventional inert desiccants such as anhydrous calcium chloride, calcium sulfate, or adsorbents such as alumina and silica gel may be employed to permit lower catalyst concentrations. Any residual catalyst can be removed from the treated fuel by water washing. It is sometimes desirable to use nitrogen blanketing to minimize emulsification when water washing. During the treatment small amounts of polymer may be formed, and in this case it is usually desirable to remove these from the treated fuel by re-distillation.

In order to further illustrate the present invention, the following examples are given which should not be construed as limiting the same in any manner whatsoever.

EXAMPLE I

Six finished gasoline blends containing catalytically and thermally cracked components were treated with ethyl oxalate as follows: 50 milliliter samples of the fuels were shaken one-half hour at room temperature with a treating mixture prepared by dissolving 2 grams of sodium in 40 milliliters of absolute ethanol and then adding 12 grams of ethyl oxalate. After the one-half hour reaction period, the mixtures were washed several times with water.

The effectiveness of the treating method was evaluated by means of a laboratory test based on the reaction of deposit forming hydrocarbons in the fuel with p-nitroaniline diazonium fluoborate. In this procedure, the diazonium reagent is dissolved in acetone and a small amount of gasoline added. The color that develops on standing is measured by means of a photometer. The results are expressed as optical density values, which give a good indication of the performance of the gasoline in the CRC FL-2 Chevrolet engine test or other "low" temperature engine tests. Gasolines which give relatively low diazonium fluoborate optical densities are "clean" fuels, that is, they cause relatively little deposits in an engine, while gasolines which give high optical densities in this test are "dirty" fuels.

Diazonium fluoborate optical density values on the untreated gasolines treated with ethyl oxalate as described above are shown in the following table:

*Diazonium fluoborate optical density*

| Gasoline | Untreated | Treated | Per Cent Reduction |
|---|---|---|---|
| 1 | 0.53 | 0.18 | 65 |
| 2 | 0.25 | 0.10 | 60 |
| 3 | 0.18 | 0.08 | 55 |
| 4 | 0.13 | 0.05 | 60 |
| 5 | 0.09 | 0.05 | 55 |
| 6 | 0.08 | 0.03 | 60 |

EXAMPLE II

A gasoline containing thermally cracked naphtha of which the 271° F.+fraction was treated with 5 pounds of 98% sulfuric acid per barrel and also containing heavy catalytic naphtha of which the 330° F.+fraction was similarly acid treated, was contacted with ethyl oxalate as described in Example I. The diazonium fluoborate optical density of the original gasoline was 0.12 before ethyl oxalate treating and 0.05 after treating or a 60% reduction in deposit forming tendency. This result indicates that treatment with ethyl oxalate removes undesirable compounds not removed by conventional acid treating procedures.

EXAMPLE III

The results of ethyl oxalate treatment of a light catalytic naphtha before and after hydrogenation to improve cleanliness quality are shown in the following table:

*Diazonium fluoborate optical density*

| Fuel | Untreated | Treated | Per Cent Reduction |
|---|---|---|---|
| Light Catalytic Naphtha | 0.52 | 0.15 | 70 |
| Hydrogenated Light Catalytic Naphtha | 0.06 | 0.04 | 35 |

The 35% reduction in optical density for the hydrogenated light catalytic naphtha indicates again that ethyl oxalate is effective in removing undesirable materials not converted by the hydrogenation treatment.

EXAMPLE IV

In a series of experiments 250 ml. portions of a blend consisting of 90% thermally cracked and 10% catalytically cracked naphtha were treated with various amounts of ethyl oxalate reagent and sodium ethoxide catalyst as shown in the following table. At the end of the reaction the samples were washed with water.

| Ethyl Oxalate, g. | Catalyst | | Reaction Time, Hrs. | Diazonium Fluoborate Optical Density |
|---|---|---|---|---|
| | Sodium, g. | Ethanol, ml. | | |
| (1) | (1) | (1) | (1) | 0.63 |
| 1.5 | 0.5 | 5 | 1 | 0.40 |
| 3 | 0.25 | 5 | 1 | 0.38 |
| 3 | 0.25 | 10 | 24 | 0.36 |
| 3 | 0.5 | 10 | 1 | 0.37 |
| 3 | 1.0 | 10 | 1 | 0.43 |
| 3 | 1.0 | 10 | 24 | 0.30 |
| 6 | 2.0 | 20 | 1 | 0.30 |

[1] No treatment.

In general, higher concentrations of reagent and catalysts and longer reaction times favor greater reduction in engine deposit forming tendency. It will be noted from the above data, however, that substantial improvement is obtained when employing small amounts of reagent and catalyst, and relatively short reaction times.

EXAMPLE V

In another experiment 22 gallons of the fuel described in Example IV was treated in an atmosphere of nitrogen with 1,000 grams of ethyl oxalate and 200 grams of sodium dissolved in 3300 ml. of absolute ethanol. The reaction time was one hour and the reaction temperature about 70° F. The reaction mixture was washed with a total of 17.5 gallons of water at the end of the one hour period. The product was distilled to remove small amounts of polymer and tested by a low temperature Lauson engine test procedure. The operating conditions in this test are as follows:

| | |
|---|---|
| Speed, R. P. M. | 1840 |
| Indicated power, KB | 3.6 |
| Jacket temperature, °F. | 95 |
| Oil temperature, °F. | 145 |
| Intake air temperature, °F. | 120 |
| Air-fuel ratio | 13/1 |
| Spark advance, deg. | 25 |
| Oil charge, lbs. | 1.0 |

At the end of the test the engine is dismantled and the parts are examined and rated for the amount and character of deposits. These ratings are in the form of standardized numerical demerits which are combined into a weighted overall demerit rating. The ratings are expressed as "percent of reference," that is, compared to the results obtained on a standard reference fuel in the same test engine. The results for the ethyl oxalate treated fuel is shown below and for purposes of comparison data for the untreated fuel and also the untreated fuel treated with 5 pounds of 80% sulfuric acid per barrel are shown.

| | Relative engine deposits per cent of reference |
|---|---|
| Untreated | 187 |
| Treated with ethyl oxalate | 136 |
| Treated with sulfuric acid | 157 |

The reduction in deposit forming tendency from 187 to 136% of reference actually represents more than the 40% reduction indicated since demerit ratings correlate approximately with the logarithm of the weight of engine deposits.

From the above examples it is evident that the process of the present invention affords an excellent method of removing undesirable constituents from gasolines and it is better than treating with sulfuric acid, the most widely used method at the present time.

The nature of the present invention having thus been fully set forth and specific examples of the same given, what is claimed as new and useful and desired to be secured by Letters Patent is.

What is claimed is:

1. A method for removing undesirable engine deposit forming compounds from gasoline which comprises treating said gasoline with a small amount of an alkyl oxalate in the presence of a small amount of an alkali alcoholate.

2. Process according to claim 1 in which the alcoholate is a sodium alcoholate having 1 to 4 carbon atoms to the molecule.

3. Process according to claim 1 in which the oxalate is ethyl oxalate.

4. Process according to claim 1 in which the alkyl oxalate is in alcohol solution.

5. Process according to claim 4 in which the solution is employed in proportions of 0.1 to 2% per volume of oil.

6. Process according to claim 1 in which the treatment with oxalate is followed by water washing.

7. Process according to claim 1 in which the treatment with oxalate is followed by distillation.

8. A method for removing undesirable engine deposit forming compounds from gasoline which comprises treating said gasoline with a small amount of ethyl oxalate dissolved in ethyl alcohol and containing a small amount of sodium ethoxide.

9. Process according to claim 1 in which the said gasoline is a thermally cracked gasoline.

10. Process as in claim 1 in which the said gasoline is a catalytically cracked gasoline.

11. A method for treating a cracked petroleum distillate which comprises treating said distillate with a small amount of an alkyl oxalate in the presence of a small amount of an alkali alcoholate.

12. A method for treating a cracked petroleum distillate which comprises treating said distillate with a small amount of an alkyl oxalate in alcohol solution in the presence of a small amount of an alkali alcoholate, and thereafter water washing the treated, cracked distillate.

JOHN O. SMITH, JR.
ALLEN R. JONES.

REFERENCES CITED

The following references are of record in the file of this patent:

UNITED STATES PATENTS

| Number | Name | Date |
|---|---|---|
| 1,939,839 | Williams et al. | Dec. 19, 1933 |

FOREIGN PATENTS

| Number | Country | Date |
|---|---|---|
| 401,353 | Germany | Sept. 2, 1924 |
| 518,593 | France | Jan. 6, 1921 |